Patented May 16, 1950

2,507,647

UNITED STATES PATENT OFFICE 2,507,647

SYNTHESIS OF β-IONYLIDENE ACETALDEHYDE

Charles D. Robeson and Clyde C. Eddinger, Rochester, N. Y., assignors, by mesne assignments, to Eastman Kodak Company, Rochester, N. Y., a corporation of New Jersey No Drawing. Application March 23, 1948, Serial No. 16,625

7 Claims. (Cl. 260—598)

This invention relates to new and improved vitamin A intermediates, and in particular to derivatives of α,β-unsaturated alcohols and primary aromatic amines and to α,β-unsaturated aldehydes and methods of preparing the same.

This invention has for its object to provide a procedure whereby α,β-unsaturated alcohols may be converted to corresponding α,β-unsaturated aldehydes in good yield. Another object is to provide a method for making derivatives of α,β-unsaturated alcohols and primary aromatic amines. A further object is to provide a method whereby β-ionylidene acetaldehyde may be prepared from β-ionylidene ethanol. Other objects will appear hereinafter.

These and other objects are accomplished by this invention, which includes subjecting α,β-unsaturated alcohols to an Oppenauer oxidation in the presence of an amine compound.

In carrying out this invention as exemplified by a preferred embodiment, an α,β-unsaturated alcohol is reacted with an excess of a ketone in the presence of an aluminum or magnesium alkoxide, e. g. aluminum isopropoxide or aluminum tert-butoxide, and an amine compound, e. g. aniline. This yields an amine derivative which, upon acid hydrolysis, yields an aldehyde corresponding to the original α,β-unsaturated alcohol. This is a modification of the Oppenauer oxidation (Rec. trav. chim., 1937, 56, 141) which normally produces a ketone condensation product when applied to α,β-unsaturated alcohols (Batty et al., J. Chem. Soc., 1938, 175-9).

This invention is illustrated as follows as applied to α,β-unsaturated alcohols:

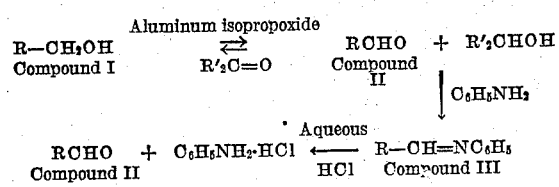

In the above series of reactions R is an α,β-unsaturated radical and R' is a hydrocarbon radical. The anil (compound III) may be isolated and is typical of amines which may be produced in the above reaction. The phenyl group attached to the nitrogen atom of compound III could be changed by employing such primary aromatic amines as α-naphthylamine or p-toluidine in place of aniline. As previously mentioned, aluminum or magnesium alkoxides may be substituted in the above reaction for aluminum isopropoxide and other primary aromatic amines may be substituted for aniline. The ketones may be dialkyl, such as diethyl, dibutyl, or ethyl methyl ketone; diaryl, such as benzophenone; or mixed alkyl-aryl such as acetophenone; cyclohexanone, and fluorenone are also satisfactory ketones in this reaction. Quinones, such as the various benzoquinones, naphthoquinones, and anthraquinones, are also satisfactory. It is preferable to carry out the above reaction in the presence of a solvent such as benzene, toluene, xylene, isopropyl ether, and similar solvents but this is not necessary. Acid hydrolysis takes place upon the addition of an aqueous acid, such as aqueous HCl. The above reaction is an equilibrium reaction forced in the direction of compound II by the presence of a primary aromatic amine in excess which reacts with the aldehyde as it is formed. In the absence of the primary aromatic amine, compound II cannot be isolated.

β-Ionylidene acetaldehyde (compound V) is prepared from β-ionylidene ethanol (compound VI) according to this invention in the following manner:

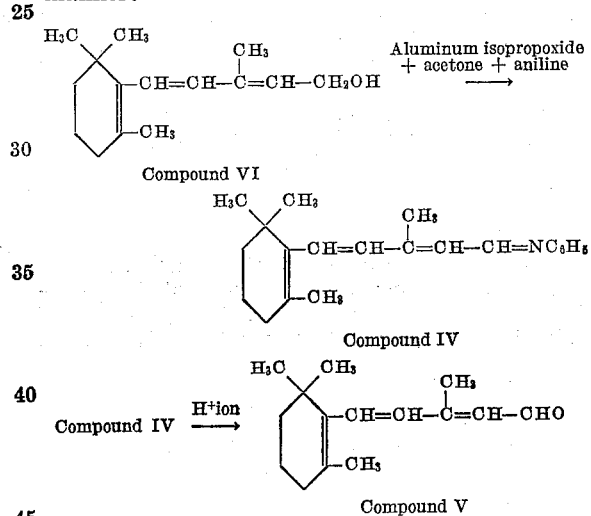

Amines that will react with aldehydes to form a Schiff base of the type

R''CH=NR''' in which R'' and R''' are organic radicals, may be substituted for aniline. Typical primary aromatic amines which are satisfactory are naphthylamines such as α-naphthylamine and β-naphthylamine; toluidines such as o-toluidine, m-toluidine, and p-toluidine; and xylidenes such as 4-amino-1,3-dimethylbenzene, 2-amino-1,4-dimethylbenzene, 3-amino-1,2-dimethylbenzene, 3-amino-1,5-dimethylbenzene, and others. Normally a quantity of amine equimolar to the alcohol will be used but excess amine may be used without interference with the reaction. Less than molar quantities of the amine may be used but in this event the aldehyde formed will be substantially equimolar to the amine used in the reaction.

In the following examples we have given several of the preferred embodiments of our invention but these are given in illustration and not in limitation thereof.

β-Ionylidene ethanol (compound VI), 0.5 g., $$E^{1\%}_{1cm.}(265\ m\mu) = 534$$

was dissolved in dry benzene (3 cc.) containing aluminum tert-butoxide (0.75 g.), and aniline (1 cc.). Diethylketone (2 cc.) was then added and the mixture, which soon set to a jell, was heated under reflux in an oil bath at 110° for 16 hours. The reaction product was then mixed with dilute hydrochloric acid (30 cc., 5%) and extracted with ether. The ether extract was thoroughly washed successively with dilute HCl, 5% sodium bicarbonate solution, and water. After drying over sodium sulfate and evaporation of the solvent, the residue weighed 0.48 g. and was shown to be mainly the aldehyde (compound IV). The product had an ultraviolet absorption curve which showed double maxima at 272 mμ and 326 mμ, with $$E^{1\%}_{1cm.} = 465 \text{ and } 497$$

respectively. A sample purified by chromatographing on Doucil, a sodium aluminum silicate, had $$E^{1\%}_{1cm.} = 540 \text{ and } 676$$

at these wavelengths. Thus, the yield of aldehyde, based on light absorption data, is 70–80% from the alcohol (compound VI).

The infrared curve on the product showed a strong characteristic aldehyde band and only a very weak hydroxyl band.

A red crystalline substance, 2,4-dinitrophenylhydrazone, a derivative of the aldehyde (compound IV) was prepared which melted at 198–200° and had $$E^{1\%}_{1cm.}(405\ m\mu) = 990$$

Proof that the aldehyde (compound IV) has the structure shown was demonstrated by condensing it with acetone in the presence of aluminum isopropoxide to yield the $C_{18}$ ketone,

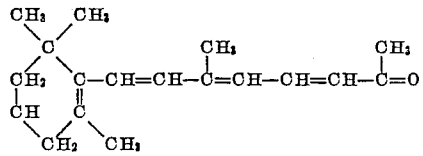

which was identified by its ultraviolet absorption properties (maxima at 345 mμ) and by the melting point of its 2,4-dinitrophenylhydrazone derivative which was identical (182°) with that of a sample prepared by another method.

In the preceding example the amine used was aniline. In further examples, the conditions were held constant except that molar quantities of different amines were substituted for aniline and the results, including those of the above example, are shown in the table:

Table

| Example | Amine | Per cent C=O as measured by infrared absorption | M. P. of dinitrophenylhydrazone derivatives |
|---|---|---|---|
| | | | °C. |
| 1 | None | 15–20% | 165–167 |
| 2 | Aniline | Strong | 198–200 |
| 3 | Naphthylamine | do | 199–200 |
| 4 | 4-amino-1,3-dimethylbenzene | do | 198–200 |
| 5 | o-Toluidine | do | 199–200 |
| 6 | Diphenylamine | Trace | 100–104 |
| 7 | n-Butylamine | 0–5 | 87– 88 |
| 8 | Cyclohexylamine | 0–5 | 93– 96 |
| 9 | Ethylenediamine | 0–5 | 129–130 |
| 10 | Pyridine | 15% | 164–166 |

From the above table it can be seen that the use of primary aromatic amines, substituted and unsubstituted, which will react with aldehydes to form a Schiff base of the type R″CH=NR‴, where R″ and R‴ are organic radicals, gives a high yield of β-ionylideneacetaldehyde. On the other hand secondary and tertiary amines give only a small quantity of ketonic material which does not conform to the properties of β-ionylideneacetaldehyde.

In the following example vitamin A was substituted for β-ionylidene ethanol. Vitamin A (3 g.) in benzene (25 cc.) was mixed with aluminum tert-butoxide (4.2 g.) in benzene (25 cc.) and aniline (4.8 cc.). To this solution was then added diethyl ketone (9.6 cc.). The reaction mixture was refluxed for 16 hours and worked up as described previously for β-ionylidene ethanol.

The product, a dark viscous red oil, $$E^{1\%}_{1cm.}(380m\mu) = 589$$

was chromatographed on sodium aluminum silicate (200 g.) and when an organe zone on the column was eluted with ethyl ether, it was found to consist of a concentrate of vitamin A aldehyde $$E^{1\%}_{1cm.}(389m\mu) = 933$$

This concentrate was dissolved in methyl acetate an when cooled to −30°, yielded crystals of vitamin A aldehyde (rust brown); M. P. 140–142°, $$E^{1\%}_{1cm.}(382m\mu) = 1140$$

The dinitrophenylhydrazone derivative of the aldehyde melted at 208–210° and had $$E^{1\%}_{1cm.}(440m\mu) = 1085$$

In the following example cinnamyl alcohol was substituted for β-ionylidene ethanol. To 1.0 g. cinnamyl alcohol in benzene (30 cc.) was added aluminum isopropoxide (2.5 g. in 15 cc. benzene), aniline (3.3 cc), and diethyl ketone (6.6 cc). The mixture was refluxed for 16 hours, cooled and worked up as described in examples using β-ionylidene ethanol.

The product contained cinnamaldehyde as shown by its ultraviolet absorption spectrum (absorption band at 285 mμ) and by the melting point of the crystalline semicarbazone (0.3–0.4 g.) prepared from it (215°).

While the invention has been described in considerable detail with reference to certain exemplary procedures and materials, it will be understood that modifications and variations therein may be effected without departing from the spirit and scope of the invention as it is defined by the appended claims.

What we claim is:

1. In a method of preparing an aldehyde, the step which comprises simultaneously reacting (1) an $\alpha,\beta$-unsaturated alcohol, (2) a primary amine characterized by having an amino group joined directly to an aromatic nucleus, and (3) a ketone, in the presence of a member selected from the group consisting of aluminum alkoxide and magnesium alkoxide and thereby forming an azomethine reaction product hydrolyzable to the corresponding $\alpha,\beta$-unsaturated aldehyde.

2. The method of preparing an aldehyde having the formula R—CHO in which R is an $\alpha,\beta$-unsaturated radical of predetermined chain length, which method comprises simultaneously reacting (1) an $\alpha,\beta$-unsaturated alcohol of the formula R—CH$_2$OH in which R is an $\alpha,\beta$-unsaturated radical of the desired chain length, (2) a ketone, and (3) a primary amine characterized by having an amino group joined directly to an aromatic nucleus, in the presence of a member selected from the group consisting of aluminum alkoxide and magnesium alkoxide and thereby forming a reaction product having the formula R—CH=N—Aryl, and thereafter hydrolyzing said reaction product and thereby forming an aldehyde having the formula R—CHO.

3. The method of preparing an aldehyde having the formula R—CHO in which R is an $\alpha,\beta$-unsaturated radical of predetermined chain length, which method comprises simultaneously reacting (1) an $\alpha,\beta$-unsaturated alcohol of the formula R—CH$_2$OH in which R is an $\alpha,\beta$-unsaturated radical of the desired chain length, (2) a ketone, and (3) aniline in the presence of a member selected from the group consisting of aluminum alkoxide and magnesium alkoxide and thereby forming a reaction product having the formula R—CH=N—Phenyl, and thereafter hydrolyzing said reaction product with aqueous acid and thereby forming an aldehyde having the formula R—CHO.

4. The method of preparing $\beta$-ionylidene acetaldehyde which comprises simultaneously reacting (1) $\beta$-ionylidene alkanol, (2) a ketone, and (3) a primary amine characterized by having an amino group joined directly to an aromatic nucleus, in the presence of a member selected from the group consisting of aluminum alkoxide and magnesium alkoxide and thereby forming a compound of the formula

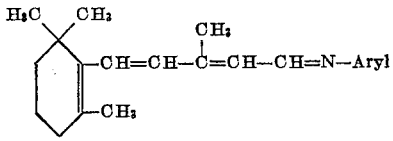

and thereafter hydrolyzing said compound to $\beta$-ionylidene acetaldehyde.

5. The method of preparing $\beta$-ionylidene acetaldehyde which comprises simultaneously reacting $\beta$-ionylidene ethanol with a ketone and a primary amine characterized by having an amino group attached directly to an aromatic nucleus, in the presence of a member selected from the group consisting of aluminum alkoxide and magnesium alkoxide, and thereafter hydrolyzing the product of said reaction with aqueous acid forming $\beta$-ionylidene acetaldehyde.

6. The method of preparing $\beta$-ionylidene acetaldehyde which comprises reacting $\beta$-ionylidene ethanol simultaneously with a ketone and aniline in the presence of a member selected from the group consisting of aluminum alkoxide and magnesium alkoxide, and thereafter hydrolyzing the product of said reaction with aqueous acid to $\beta$-ionylidene acetaldehyde.

7. The method of preparing $\beta$-ionylidene acetaldehyde which comprises simultaneously reacting $\beta$-ionylidene ethanol, aniline and diethyl ketone in the presence of a member selected from the class consisting of aluminum alkoxide and magnesium alkoxide, and thereafter hydrolyzing the reaction product with aqueous acid and thereby forming $\beta$-ionylidene acetaldehyde.

CHARLES D. ROBESON.
CLYDE C. EDDINGER.

REFERENCES CITED

The following references are of record in the file of this patent:

UNITED STATES PATENTS

| Number | Name | Date |
|---|---|---|
| 1,987,601 | Burke | Jan. 15, 1935 |
| 2,001,788 | Leaper | May 21, 1935 |
| 2,045,574 | Adkins | June 30, 1936 |
| 2,239,491 | Kuhn et al. | Apr. 22, 1941 |
| 2,388,903 | Cantrell | Nov. 13, 1945 |

OTHER REFERENCES

Kuhn et al.: "Ber. Deut. Chem.," vol. 70 (1937), pages 853–858.

Merwein et al.: "J. Prakt. Chem.," vol. 147 (1936), pages 211–225.

Merwein et al.: "Liebig's Annalen," vol. 444 (1925), pages 221–238.

Van Dorp et al.: "Nature," vol. 160 (Aug. 9, 1947), page 189.

Davies et al.: "J. Chem. Soc." (London), 1935, pages 584–587.

Batty: "J. Chem. Soc." (London), 1938, pages 175–179.

Heilbron et al.: "J. Chem. Soc." (London), 1939, pages 1560–1563.

Davies et al.: "Chemical Abstracts," vol. 37 (1943), pages 6254–6255.